US012809532B2

(12) United States Patent
Sharma et al.

(10) Patent No.: US 12,809,532 B2
(45) Date of Patent: Nov. 24, 2026

(54) DYNAMIC SYSTEM HANDLING FOR PEAK POWER CONTROL VIA PARAMETER SETTINGS ON A MEMORY DEVICE

(71) Applicant: Sandisk Technologies, Inc., Milpitas, CA (US)

(72) Inventors: Vishal Sharma, Bangalore (IN); Shiv Harit Mathur, Bangalore (IN); Varun Gopal, Bangalore (IN); Shivam Sharma, Bangalore (IN); Neha Chauhan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 62 days.

(21) Appl. No.: 19/072,031

(22) Filed: Mar. 6, 2025

(65) Prior Publication Data

US 2026/0267538 A1 Sep. 10, 2026

(51) Int. Cl.
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC .................................. G06F 1/32; G06F 3/065
See application file for complete search history.

(56) References Cited

U.S. PATENT DOCUMENTS

| | | | | |
|---|---|---|---|---|
| 8,196,086 B2 | 6/2012 | Brown | | |
| 9,293,359 B2 | 3/2016 | Do | | |
| 10,008,267 B2 | 6/2018 | Shen | | |
| 2012/0023473 A1* | 1/2012 | Brown | .................... | G06F 30/39 716/133 |
| 2016/0157264 A1* | 6/2016 | Wang | ................. | H04W 72/535 370/329 |

FOREIGN PATENT DOCUMENTS

| | | |
|---|---|---|
| CN | 13868991 | 12/2021 |
| JP | 2003243516 A | 8/2003 |

* cited by examiner

*Primary Examiner* — Keshab R Pandey
(74) *Attorney, Agent, or Firm* — Arlene P. Neal; NEAL BLIBO LLC

(57) ABSTRACT

A storage device may control peak power consumption. The storage device includes a memory device including memory cells and a channel to allow access to a group of memory cells. The storage device also includes a power optimization module to issue a sequence of commands to set channel parameter values that are associated with a channel width. A controller on the storage device may maintain a constant voltage and determine that the power being used on the storage device exceeds a power threshold. The controller may activate the power optimization module to set the channel parameter values and dynamically adjust the channel width and power consumption on the storage device according to the set channel parameter values.

20 Claims, 6 Drawing Sheets

300

| [7] | [6] | [5] | [4] | [3] | [2] | [1] | [0] | HEX | 1T | SIZE[μm] | | | |
|---|---|---|---|---|---|---|---|---|---|---|---|---|---|
| | | | | | | | | | | [1:0]=00 | [1:0]=01 | [1:0]=10 | [1:0]=11 |
| 0 | 0 | 0 | 0 | 0 | 0 | 0/1 | 0/1 | 00h | | 0.4675 | 0.4675 | 0.9350 | 1.4025 |
| 0 | 0 | 0 | 0 | 0 | 1 | 0/1 | 0/1 | 04h | | 1.8700 | 2.3375 | 2.8050 | 3.2725 |
| 0 | 0 | 0 | 0 | 1 | 0 | 0/1 | 0/1 | 08h | | 3.7400 | 4.2075 | 4.6750 | 5.1425 |
| 0 | 0 | 0 | 0 | 1 | 1 | 0/1 | 0/1 | 0Ch | | 5.6100 | 6.0775 | 6.5450 | 7.0125 |
| 0 | 0 | 0 | 1 | 0 | 0 | 0/1 | 0/1 | 10h | | 7.4800 | 7.9475 | 8.4150 | 8.8825 |
| 0 | 0 | 0 | 1 | 0 | 1 | 0/1 | 0/1 | 14h | | 9.3500 | 9.8175 | 10.2850 | 10.7525 |
| 0 | 0 | 0 | 1 | 1 | 0 | 0/1 | 0/1 | 18h | | 11.2200 | 11.6875 | 12.1550 | 12.6225 |
| 0 | 0 | 0 | 1 | 1 | 1 | 0/1 | 0/1 | 1Ch | | 13.0900 | 13.5575 | 14.0250 | 14.4925 |
| 0 | 0 | 1 | 0 | 0 | 0 | 0/1 | 0/1 | 20h | | 14.9600 | 15.4275 | 15.8950 | 16.3625 |
| 0 | 0 | 1 | 0 | 0 | 1 | 0/1 | 0/1 | 24h | | 16.8300 | 17.2975 | 17.7650 | 18.2325 |
| 0 | 0 | 1 | 0 | 1 | 0 | 0/1 | 0/1 | 28h | | 18.7000 | 19.1675 | 19.6350 | 20.1025 |
| 0 | 0 | 1 | 0 | 1 | 1 | 0/1 | 0/1 | 2Ch | | 20.5700 | 21.0375 | 21.5050 | 21.9725 |
| 0 | 0 | 1 | 1 | 0 | 0 | 0/1 | 0/1 | 30h | | 22.4400 | 22.9075 | 23.3750 | 23.8425 |
| 0 | 0 | 1 | 1 | 0 | 1 | 0/1 | 0/1 | 34h | X | 24.3100 | 24.7775 | 25.2450 | 25.7125 |
| 0 | 0 | 1 | 1 | 1 | 0 | 0/1 | 0/1 | 38h | | 26.1800 | 26.6475 | 27.1150 | 27.5825 |
| 0 | 0 | 1 | 1 | 1 | 1 | 0/1 | 0/1 | 3Ch | | 28.0500 | 28.5175 | 28.9850 | 29.4525 |
| 0 | 1 | 0 | 0 | 0 | 0 | 0/1 | 0/1 | 40h | | 29.9200 | 30.3875 | 30.8550 | 31.3225 |
| 0 | 1 | 0 | 0 | 0 | 1 | 0/1 | 0/1 | 44h | | 31.7900 | 32.2575 | 32.7250 | 33.1925 |
| 0 | 1 | 0 | 0 | 1 | 0 | 0/1 | 0/1 | 48h | | 33.6600 | 34.1275 | 34.5950 | 35.0625 |
| 0 | 1 | 0 | 0 | 1 | 1 | 0/1 | 0/1 | 4Ch | | 35.5300 | 35.9975 | 36.4650 | 36.9325 |
| 0 | 1 | 0 | 1 | 0 | 0 | 0/1 | 0/1 | 50h | | 37.4000 | 37.8675 | 38.3350 | 38.8025 |
| 0 | 1 | 0 | 1 | 0 | 1 | 0/1 | 0/1 | 54h | | 39.2700 | 39.7375 | 40.2050 | 40.6725 |
| 0 | 1 | 0 | 1 | 1 | 0 | 0/1 | 0/1 | 58h | | 41.1400 | 41.6075 | 42.0750 | 42.5425 |
| 0 | 1 | 0 | 1 | 1 | 1 | 0/1 | 0/1 | 5Ch | | 43.0100 | 43.4775 | 43.4750 | 44.4125 |
| 0 | 1 | 1 | 0 | 0 | 0 | 0/1 | 0/1 | 60h | | 44.8800 | 45.3475 | 45.8150 | 46.2825 |

TABLE

*FIG. 3*

DYNAMIC SYSTEM HANDLING FOR PEAK POWER CONTROL VIA PARAMETER SETTINGS ON A MEMORY DEVICE

BACKGROUND OF THE INVENTION

A storage device may be communicatively coupled to a host and to non-volatile memory including, for example, a NAND flash memory device on which the storage device may store data received from the host. The memory device may store data on multiple dies and as the capacity of a storage device increases, the performance requirements and power consumption of the storage device may increase. For example, when the storage device performs read or write operations at higher speeds, it may consume more power because the active components, such as the memory cells and controller circuits, may work more intensively.

In a storage device where the memory may be configured for different capacities, the maximum power consumed at given sustained sequential write (SSW) rates may exceed the allowable peak power for the storage device. While the SSW rates may be attainable by, for example, limiting the maximum number of parallel dies per channel, peak power issues, and in some instances average power issues, may remain prevalent with higher die stacking configurations and efforts to achieve enhanced performance. Exceeding the allowable peak power may cause the storage device to enter a non-functional state and increase the host's driving capability in certain cases, which is impermissible. When issues related to exceeding the allowable peak power are addressed, identification of the bill of material components for the storage device may improve.

To address peak power consumption, a time division peak power management (TDPPM) approach may be used, wherein time-based peak power may be controlled and distributed across dies. A die may be assigned a particular slot on which to operate and distribute the peak power and each die may be allocated one or more slots for handling the peak power. When there is an anticipated peak power at a slot other than the slot allocated to a die, the die must wait for its allocated slot, possibly decreasing performance on the storage device. Even in the absence of simultaneous peak power across multiple dies, a performance penalty may persist due to the need for a die to wait for its assigned time slot because each die is only aware of its own allocated peak current time slot and is unaware of the operations occurring in the other dies. Furthermore, if a first die enters peak operation at the end of its allocated time slot, while a second die is beginning its peak operation at the start of its own allocated slot, peak current overlap may occur. To correct the peak current overlap, fine-tuning of an external clock frequency and die allocation time slots improvements may be necessary. However, despite such fine-tuning efforts, in a system with a given number of dies (for example, eight dies), peak power overlap may remain a potential issue when all eight dies are enabled. TDPPM might not be suitable for all types of NAND flash memory applications, particularly those with very high or very low power requirements and its effectiveness may vary depending on specific use case and workload characteristics.

Another approach used to address peak power consumption uses command B2 for power control in NAND flash memory, wherein command B2 may be used before issuing any read or write operations. Command B2 may introduce overhead due to the need for additional cycles or waiting periods while managing power states. This overhead may impact overall system performance and latency, and as such although.it may result in power saving, a significant performance hit may occur. Efficient power management using command B2 may require precise timing and coordination across multiple dies or memory chips and managing these states may be complex, particularly in systems with many chips.

Another approach used to address peak power consumption may use capacitors to smooth out power fluctuations, reduce noise, and manage the dynamic power demands of NAND memory during read and write operations. This approach may limit the peak or average powers. However, the bill of material cost for a storage device using this approach may increase, average power may take a hit even though peak power may be addressed, the form factor of some storage devices may not allow capacitors to be used due to limited space, the effectiveness may be limited at extreme conditions, and/or there may be trade-offs with other components.

SUMMARY OF THE INVENTION

In some implementations, a storage device may control peak power consumption. The storage device includes a memory device including memory cells and a channel to allow access to a group of memory cells. The storage device also includes a power optimization module to issue a sequence of commands to set channel parameter values that are associated with a channel width. A controller on the storage device may maintain a constant voltage and determine that the power being used on the storage device exceeds a power threshold. The controller may activate the power optimization module to set the channel parameter values and dynamically adjust the channel width and power consumption on the storage device according to the set channel parameter values.

In some implementations, a method is provided on the storage device for controlling control peak power consumption on the storage device. The method includes maintaining a constant voltage on the storage device and determining that power being used on the storage device exceeds a power threshold and that a power counter value is less than a counter threshold. The method also includes entering a process loop and activating a power optimization module to set channel parameter values and dynamically adjusting a channel width and power consumption on the storage device according to set channel parameter values. The method further includes remaining in the process loop until the power counter value exceeds the counter threshold or the power being used on the storage device falls below the power thresholds In some implementations, a storage device may control peak power consumption. The storage device includes a memory device including memory cells and a channel to allow access to a group of memory cells. The storage device also includes a power optimization module to issue a sequence of commands to set channel parameter values that are associated with a channel width. A controller on the storage device may maintain a constant voltage on the storage device. The controller may also determine that the power being used on the storage device exceeds a power threshold and that a power counter value is less than a counter threshold. The controller may enter a process loop wherein the controller activates the power optimization module to set the channel parameter values and dynamically adjust the channel width and power consumption on the storage device according to the set channel parameter values. The controller may remain in the process loop until the power counter value exceeds the counter threshold or the power being used on the storage device falls below the power threshold.

BRIEF DESCRIPTION OF THE DRAWINGS

FIG. 3 is an example table that shows the interrelation between the channel width and components on memory device 110 in accordance with some implementations.

Figure 1:
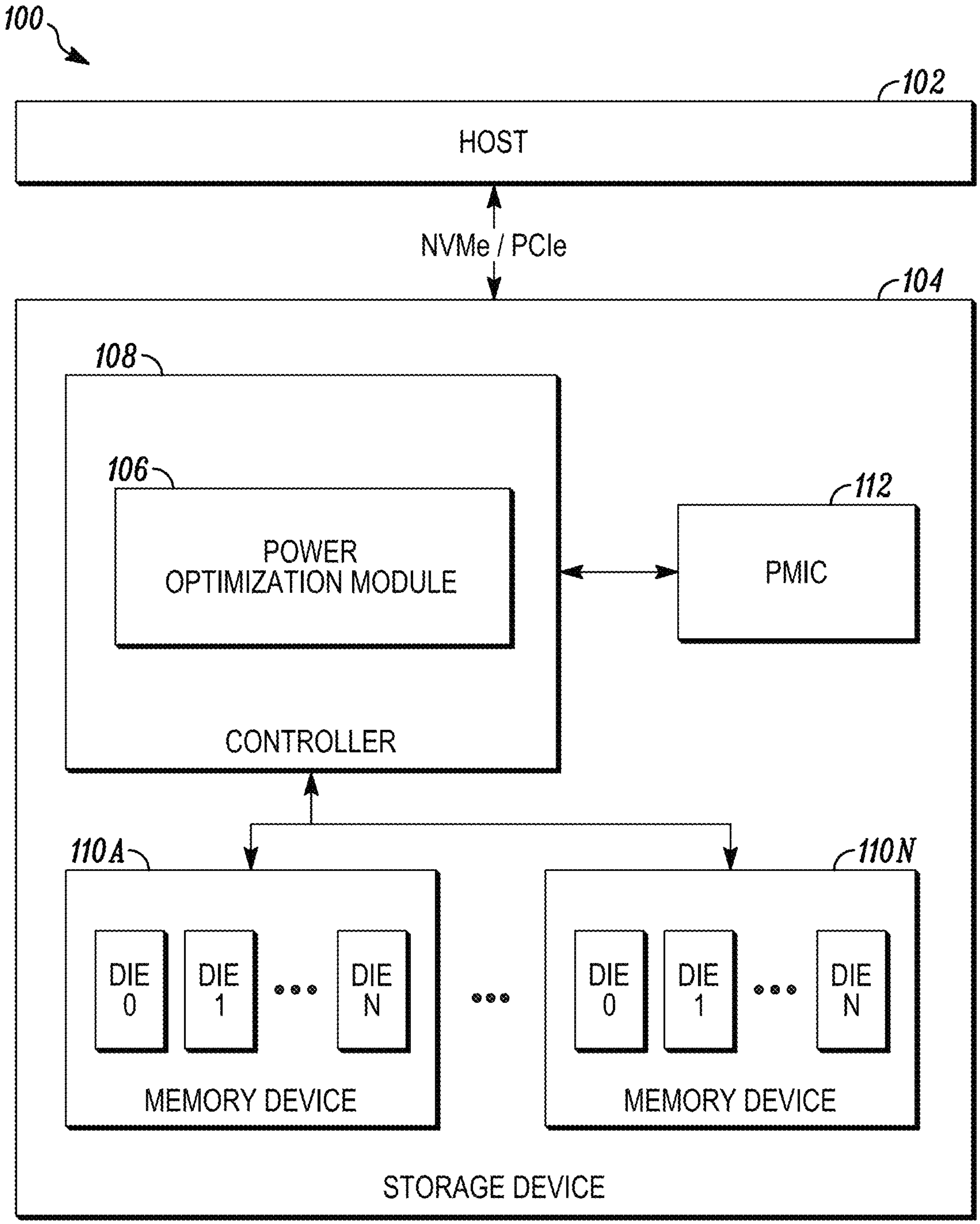
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Host 102 may provide operational power for storage device 104 and the maximum/peak host power to be used by storage device 104 may be predefined. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may be, for example, a solid-state drive (SSD) that may include a power optimization module 106, a controller 108, and one or more storage components such as non-volatile memory devices 110*a*-110*n* (referred to herein as the memory device(s) 110). Power optimization module 106 may issue a sequence of commands to memory device 110 to set the values of one or more parameters that may be used to control peak power consumption on memory device 110.

Controllers 108 may interface with host 102 and process foreground operations including instructions transmitted from host 102. For example, controllers 108 may read data from and/or write to memory devices 110 based on instructions received from host 102. Controllers 108 may also execute background operations to manage resources on memory device 110. For example, controllers 108 may monitor memory devices 110 and may execute garbage collection and other relocation functions per internal relocation algorithms to refresh, recycle, and/or relocate the data on memory devices 110.

Memory devices 110 may be flash based. For example, memory devices 110 may be a NAND or NOR flash memory that may be used for storing host and control data over the operational life of memory devices 110. Memory devices 110 may include one or more dies (i.e., DIE 1-DIE N) connected to a memory bus including data lines and chip enable lines. Memory devices 110 may save data in blocks on the dies and may rely on electric circuits to store data. Data may be stored in the blocks in various formats, with the formats being defined by the number of bits that may be stored per memory cell. The memory cells may be made with control and floating gates, both of which may help control the flow of data. To program one cell, a voltage charge may be sent to the control gate. Memory device 110 may be included in storage device 104 or may be otherwise communicatively coupled to storage device 104.

A NAND channel on memory device 110 may be a communication pathway within a memory chip/die that may allow controller 108 to access and manage a specific group of memory cells simultaneously, essentially enabling parallel data transfer between controller 108 and multiple dies within storage device 104. Controller 108 may address power-related issues by maintaining a constant voltage while simultaneously adjusting the NAND channel width. For instance, while maintaining a constant voltage, controller 108 may dynamically adjust the values in parameters associated with the channel width to dynamically increase or decrease the power consumption of storage device 104. When the values of the parameters associated with the channel width increase, the power consumption on storage device 104 may increase and when the values of the parameters associated with the channel width decrease, the power consumption on storage device 104 may decrease. With this approach, controller 108 may effectively manage power requirements while substantially reducing performance degradation.

Controller 108 may regulate the channel width by adjusting the values of specific NAND parameters (referred to herein as channel parameters), which may vary across different types of storage devices 104. The channel parameters may be related to the channel width and controller 108 may adjust the values of these parameters within certain delta margins from a default value. By adjusting the values of the channel parameters, controller 108 may assist in fine-tuning the performance and power consumption of the memory cells. In one type of storage device, the channel parameters may be ON Resistance (RON) parameters for a given input voltage. For example, the channel parameter may be RON_NO12 and/or RON_PO12 with respect to a $1.2V_{IO}$. The RON_NO12 and/or RON_PO12 parameters may directly reflect the parameter values for the channel width and may correspond to the certain addresses, for example, 0xF1 and 0xF2 respectively, in memory device 110. In another example, the channel width parameters with respect to 1.8 $V_{IO}$ may be, for example, RON_NO18 and/or RON_PO18 which may correspond to the 0xF3 & 0xF4 addresses respectively. The addresses and corresponding values related to the channel width and other memory parameters may vary across different storage devices 104. In one type of storage device 104, the values for the channel width may range from 0.9 micrometers (μm) to 229 μm with a default value set to 81.9 μm.

In a typical NAND flash memory, the operation and characteristics of transistors, particularly in the context of memory cells, can be described using the transistor equation related to Metal-Oxide-Semiconductor Field-Effect Transistors (MOSFET), i.e., $$I_D = \frac{1}{2}\mu_n C_{ox} \frac{W}{L - \Delta L}(V_{GS} - V_{TH})^2,$$

Where $\mu_n$ is the electron mobility in the n-channel MOSFET, $C_{ox}$ is the oxide capacitance per unit area, W is the width of the transistor channel, L is the channel Length, L−ΔL is the effective channel length, adjusted for any variation (ΔL), $V_{GS}$ is the gate-to-source voltage and $V_{TH}$ is the threshold voltage of the MOSFET. The above equation may help in understanding the behavior of memory cells in terms of current, voltage and other memory parameters.

Controller 108 may maintain a power counter that may be used to prevent infinite loop conditions while controller 108 dynamically adjusts the channel parameters values. Controller 108 may initially set the value of the power counter to, for example, zero. When controller 108 receives an interrupt signal from a power management integrated circuit (PMIC) 112 indicating that the power being used on storage device 104 exceeds a specified power threshold, controller 108 may confirm that the power being used on storage device 104 exceeds the power threshold and that the power counter value is less than a power counter threshold. For example, controller 108 may determine if the counter value is less than five (i.e., the power counter threshold in this example).

If those conditions are true, controller 108 may enter a process loop, elevate a power optimization priority, and activate power optimization module 106. Power optimization module 106 may issue a NAND command sequence for setting the channel parameter values for the channel width (W) mentioned in the equation above. An example of the command sequence issued by power optimization module 106 may include a command to select a die, a command to enter a user mode, an optional command to disable a bit, for example, the 9 bit, a command to change PMOS/NMOS values (i.e., the channel width values) by changing the values of the addresses associated with the channel parameters, a command to set the changed values, a command to update local registers with the user values, and a command to exit the sequence.

Power optimization module 106 may also monitor the status of memory device 110. When power optimization module 106 receives success status from memory device 110, power optimization module 106 may invoke controller 108 to retrieve the PMIC power data (i.e., data defining the power being used on storage device 104 also referred to herein as the power consumption data). Controller 108 may then compare the PMIC power data against the power threshold. If the power level on storage device 104 is reduced such that the PMIC power data is below the power threshold, controller 108 may exit the process loop.

If the power level is still above the power threshold, controller 108 may increase the power counter value and remain in the process loop wherein controller 108 may determine if the power counter is greater than the counter threshold. If these conditions still exist, controller 108 may maintain the elevated power optimization priority and controller 108 may reactivate power optimization module 106. Power optimization module 106 may issue the NAND command sequence for setting the channel parameters values for the channel width and monitor the NAND status. When power optimization module 106 receives a success status from memory device 110, power optimization module 106 may invoke controller 108 to retrieve the PMIC power data and controller 108 may then compare the PMIC power data against the power threshold. If the power level on storage device 104 is reduced such that the PMIC power data is below the power threshold, controller 108 may exit the process loop. To avoid system timeouts, when the power counter reaches or exceeds the power counter threshold, controller 108 may exit the process loop, even if the power level remains above the power threshold. Otherwise, controller 108 may remain in the process loop and execute the steps outlined above.

By adjusting the NAND parameters to modify the channel width, controller 108 may dynamically reduce the power being used on storage device 104 up to approximately thirty-five percent from a default value. For high-performance storage device where power constraints may limit the number of active dies that may be used at a given time and thus prevent storage device 104 from achieving optimal performance, potential power consumption is a critical concern and the power reduction carried out by controller 108 may be advantageous. Compared to current power management approaches such as TDPPM, using command B2, and/or using capacitors, the power reduction carried out by controller 108 is less complex, involves limited firmware changes, and may be implemented by issuing few commands. By eliminating the need for additional capacitors, the power reduction carried out by controller 108 does not increase the bill of materials cost for storage device 104.

Storage device 104 may perform these processes based on one or more processors, for example, controller 108 (and other components on storage device 104 including power optimization module 106) executing software instructions stored by a non-transitory computer-readable medium, such as storage component/memory device 110. As used herein, the term "computer-readable medium" refers to a non-transitory memory device. Software instructions may be read into storage component 110 from another computer-readable medium or from another device. When executed, software instructions stored in storage component 110 may cause controller 108 (and other components on storage device 104 including power optimization module 106) to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
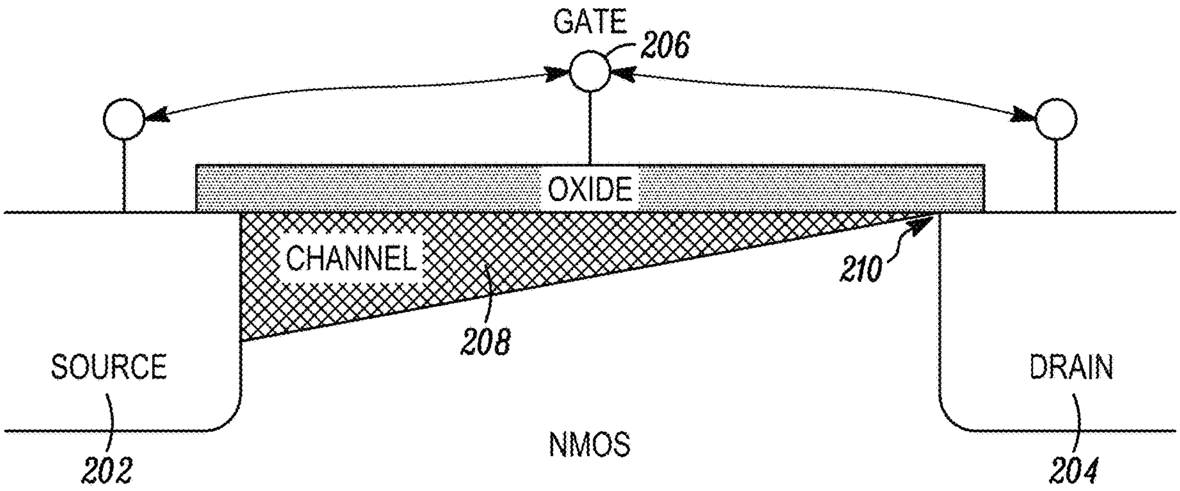
FIG. 2 is an example schematic diagram of a typical n-channel Metal-Oxide-Semiconductor Field-Effect Transistors (MOSFET) (NMOS).

FIG. 2 is an example schematic diagram of a typical n-channel Metal-Oxide-Semiconductor Field-Effect Transistors (MOSFET) (NMOS). The NMOS includes a source 202, a drain 204, and a gate 206. Channel 208 may be formed between source 202 and drain 204. When the width of channel 208 is modulated, the size of channel 208 may shrink, as shown at 210. When the width of channel 208 is reduced and the voltage being used on storage device 104 remains constant, the power being consumed on storage device may also reduce. When the width of channel 208 is increased and the voltage being used on storage device 104 remains constant, the power being consumed on storage device may also increase. FIG. 2 is provided as an example. Other examples may differ from what is described in FIG. 2.

FIG. 3 is an example table that shows the interrelation between the channel width and components on memory device 110 in accordance with some implementations. The values in table 300 may be associated with a given type of storage device 104 and may be stored in channel parameters including, for example, 1.2$V_{IO}$ RON_NO12/RON_PO12 parameters that correspond to 0xF1 and 0xF2 addresses respectively or 1.8 $V_{IO}$ RON_NO18/RON_PO18 parameters that correspond to 0xF3 & 0xF4 addresses respectively. The default value for the channel parameters based on table 300 may be 24.3100 and 24.7775 respectively. Based on the values in table 300, the channel parameter values may range from 0.4675 for both channel parameters to 45.8150 and 46.2825 for the respective channel parameters.

Depending on the power consumption of storage device 1044 controller 108 may dynamically modify the values in the channel parameters. For example, controller 108 may reduce the values in the channel parameters from the default values down to the low range of 0.4675 for both channel parameters. In so doing, controller 108 may reduce the power consumption of storage device 104. Controller 108 may also increase the values in the channel parameters up to the 45.8150 and 46.2825 respectively, and in so doing, increase the power consumption of storage device. FIG. 3 is provided as an example. Other examples may differ from what is described in FIG. 3.

Figure 4:
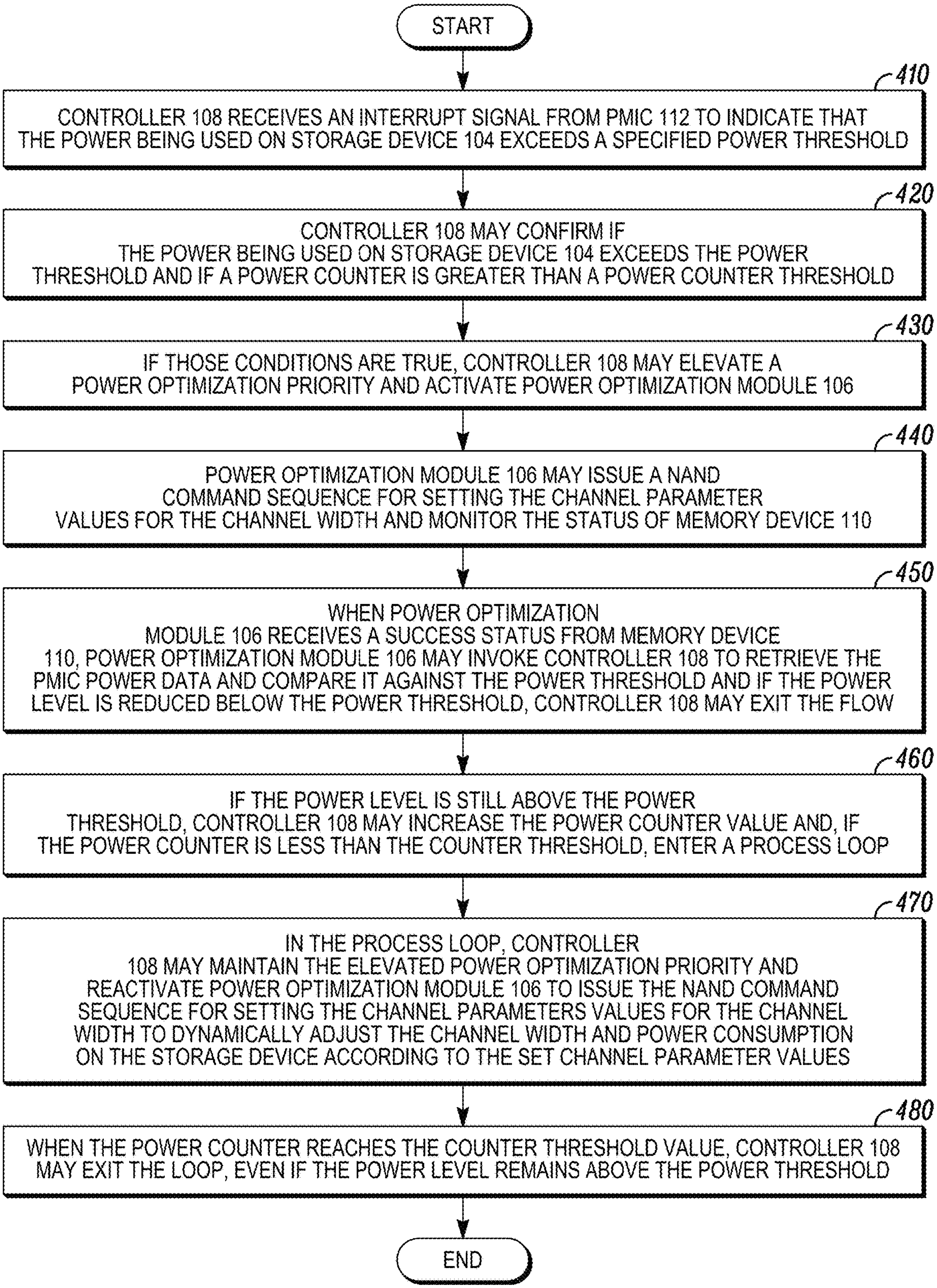
FIG. 4 is an example flow diagram for depicting power reduction via a NAND command sequence in accordance with some implementations.

FIG. 4 is an example flow diagram for depicting power reduction via a NAND command sequence in accordance with some implementations. At 410, controller 108 receives an interrupt signal from PMIC 112 to indicate that the power being used on storage device 104 exceeds a specified power threshold. At 420, controller 108 may confirm if the power being used on storage device 104 exceeds the power threshold and if a power counter is greater than a power counter threshold. At 430, if those conditions are true, controller 108 may elevate a power optimization priority and activate power optimization module 106. At 440, power optimization module 106 may issue a NAND command sequence for setting the channel parameter values for the channel width and monitor the status of memory device 110. At 450, when power optimization module 106 receives a success status from memory device 110, power optimization module 106 may invoke controller 108 to retrieve the PMIC power data and compare it against the power threshold and if the power level is reduced below the power threshold, controller 108 may exit the flow. At 460, if the power level is still above the power threshold, controller 108 may increase the power counter value and, if the power counter is less than the counter threshold, enter a process loop. At 470, in the process loop, controller 108 may maintain the elevated power optimization priority and reactivate power optimization module 106 to issue the NAND command sequence for setting the channel parameters values for the channel width to dynamically adjust the channel width and power consumption on the storage device according to the set channel parameter values. At 480, when the power counter reaches the counter threshold value, controller 108 may exit the loop, even if the power level remains above the power threshold. As indicated above FIG. 4 is provided as an example. Other examples may differ from what is described in FIG. 4.

Figure 5:
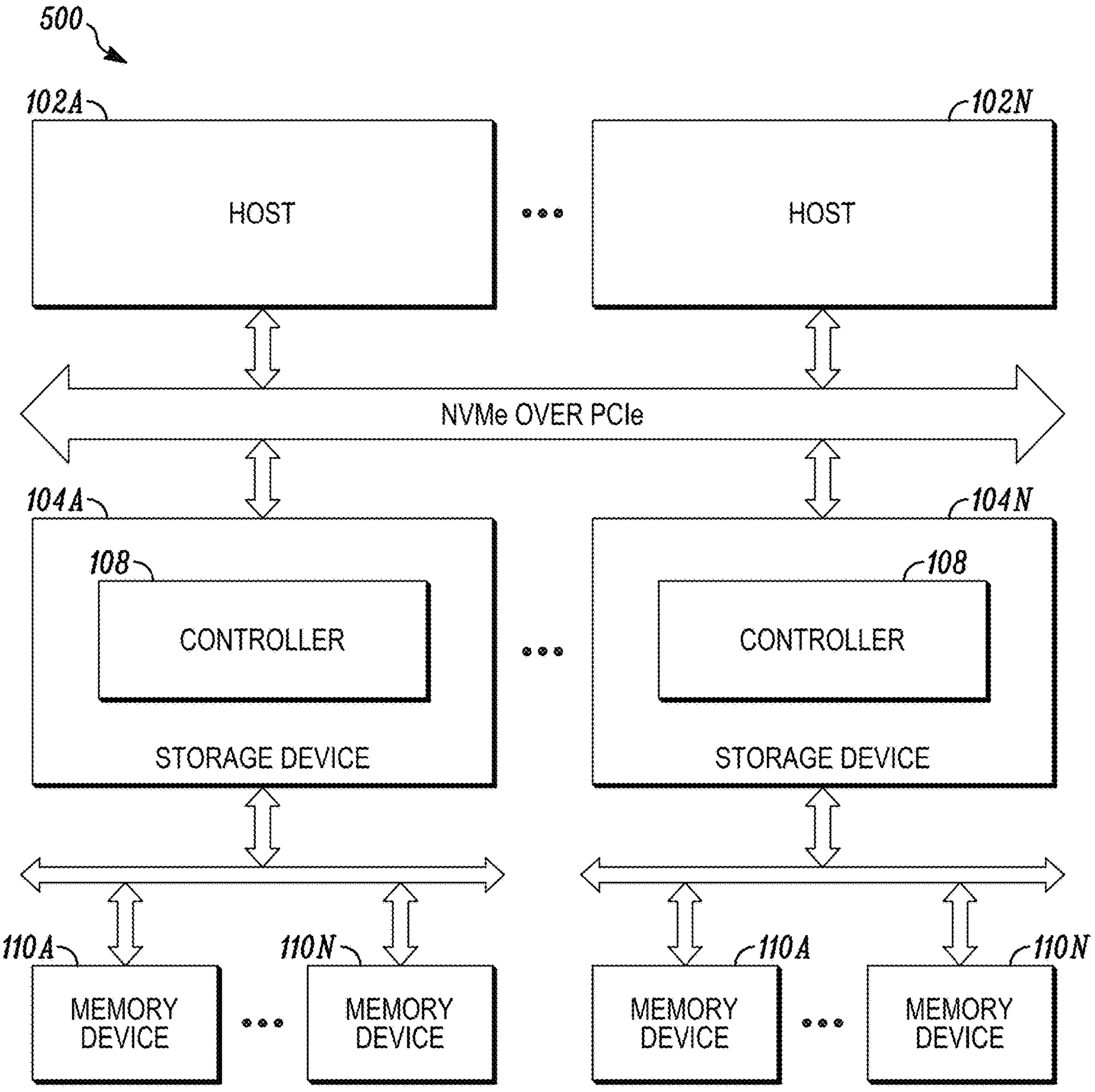
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Controller 108 may modulate a channel width on memory device 110 to decrease power consumption on storage device 104. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
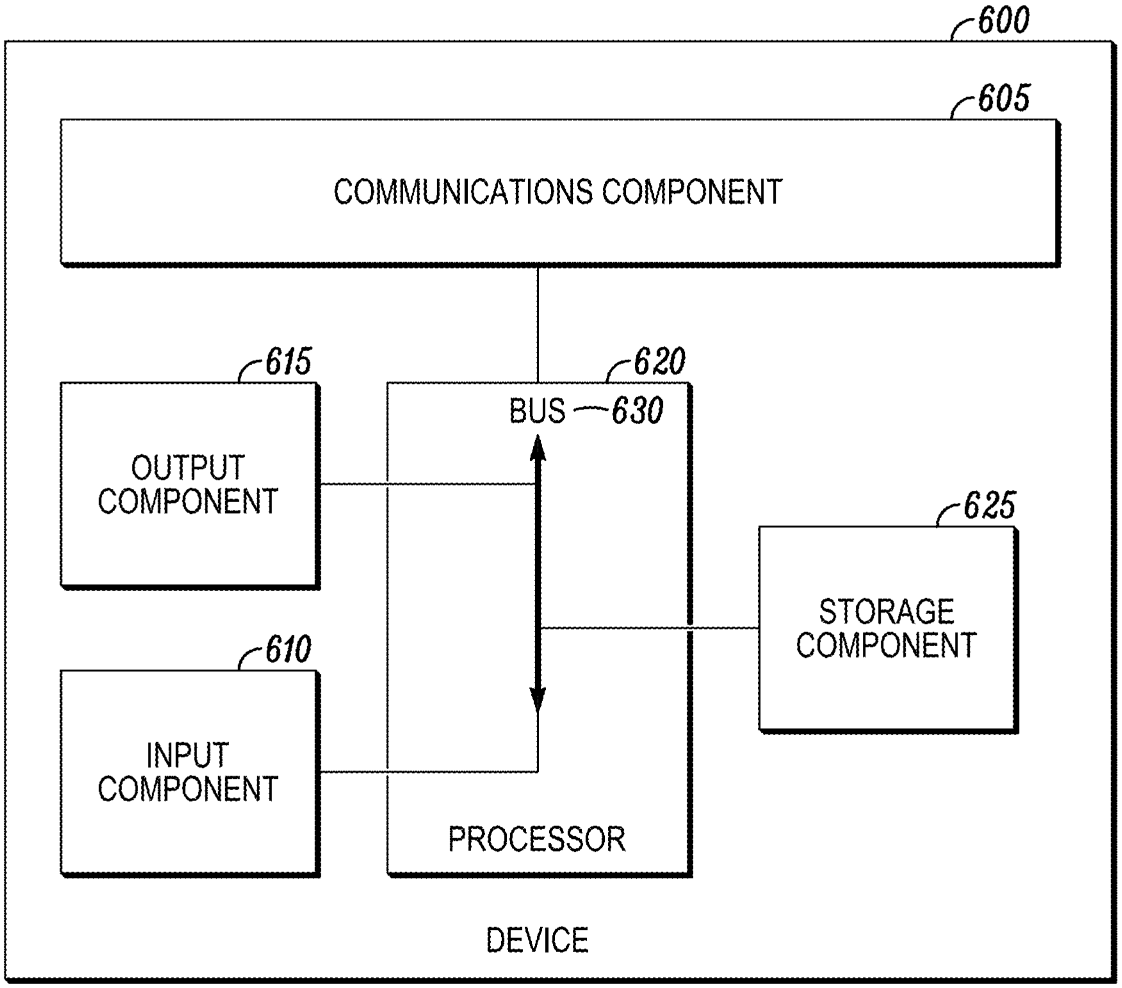
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to control peak power consumption on the storage device, the storage device comprises:

a memory device including memory cells and a channel to allow access to a group of memory cells;

a power optimization module to issue a sequence of commands to set channel parameter values that are associated with a channel width; and a controller to maintain a constant voltage, determine that power being used on the storage device exceeds a power threshold, activate the power optimization module to set the channel parameter values and dynamically adjust the channel width and power consumption on the storage device according to the set channel parameter values.

2. The storage device of claim 1, wherein the controller adjusts the channel parameter values within a delta margin from a default value.

3. The storage device of claim 1, wherein values for the channel width range from 0.9 micrometers (μm) to 229 μm with a default value set to 81.9 μm for a storage device type.

4. The storage device of claim 1, wherein the channel parameters are ON Resistance (RON) parameters for a given input voltage, wherein the RON parameters reflect values for the channel width and the RON parameters correspond to addresses in the memory device.

5. The storage device of claim 4, wherein the addresses and the values for the channel width vary across storage device types.

6. The storage device of claim 1, wherein the controller maintains a power counter and uses the power counter to prevent an infinite loop condition while the controller dynamically adjusts the channel parameter values.

7. The storage device of claim 1, further comprises a power management integrated circuit to provide an indication to the controller when the power being used on the storage device exceeds a power threshold.

8. The storage device of claim 1, wherein when the controller determines that the power being used on the storage device exceeds a power threshold and that a power counter value is less than a counter threshold, the controller enters a process loop, elevates a power optimization priority, and activates the power optimization module.

9. The storage device of claim 8, wherein the controller compares power consumption data against a power threshold and exits the process loop when a power level on the storage device is less than the power threshold.

10. The storage device of claim 9, wherein when the controller determines that the power consumption data exceeds the power threshold and that a power counter is less than a counter threshold, the controller increases the power counter and enters the process loop, wherein in the process loop, the power optimization module sets the channel parameter values and the controller dynamically adjusts the channel width and power consumption on the storage device according to the set channel parameter values.

11. The storage device of claim 1, wherein the power optimization module issues a command sequence to set the channel parameter values and monitors a status of the memory device.

12. The storage device of claim 11, wherein the command sequence includes a command to select a die, a command to enter a user mode, a command to change the channel parameter values, a command to set the changed channel parameter values, a command to update local registers with the changed channel parameter values, and a command to exit the sequence.

13. The storage device of claim 11, wherein when the power optimization module receives a success status from the memory device, the power optimization module invokes the controller to retrieve power consumption data from the storage device.

14. A method on a storage device for controlling control peak power consumption on the storage device, the storage device comprises a controller to execute the method comprising:

maintaining a constant voltage on the storage device;

determining that power being used on the storage device exceeds a power threshold and that a power counter value is less than a counter threshold;

entering a process loop and activating a power optimization module to set channel parameter values and dynamically adjusting a channel width and power consumption on the storage device according to set channel parameter values; and remaining in the process loop until one of the power counter value exceeds the counter threshold and the power being used on the storage device falls below the power thresholds.

15. The method of claim 14, further comprising adjusting the channel parameter values within a delta margin from a default value.

16. The method of claim 14, further comprising receiving a power consumption indication from a power management integrated circuit when the power being used on the storage device exceeds the power threshold.

17. The method of claim 14, further comprising compares power consumption data against the power threshold and exiting the process loop when a power level on the storage device is less than the power threshold.

18. The method of claim 14, further comprising determining that the power being used on the storage device exceeds the power threshold and that the power counter value is less than the counter threshold, increasing the power counter and entering the process loop, elevating a power optimization priority, and activating the power optimization module.

19. A storage device to control peak power consumption on the storage device, the storage device comprises:

a memory device including memory cells and a channel to allow access to a group of memory cells;

a power optimization module to issue a sequence of commands to set channel parameter values that are associated with a channel width; and a controller to maintain a constant voltage, determine that power being used on the storage device exceeds a power threshold and that a power counter value is less than a counter threshold, enter a process loop wherein the controller activates the power optimization module to set the channel parameter values and dynamically adjust the channel width and power consumption on the storage device according to the set channel parameter values, and remain in the process loop until one of the power counter value exceeds the counter threshold and the power being used on the storage device falls below the power threshold.

20. The storage device of claim 19, wherein the power optimization module issues a command sequence to set the channel parameter values and monitors a status of the memory device and when the power optimization module receives a success status from the memory device, the power optimization module invokes the controller to retrieve power consumption data from the storage device.

* * * * *